United States Patent
Mayer

[11] 3,944,988
[45] Mar. 16, 1976

[54] IMAGE-DISPLAY SYSTEM INTERACTING WITH LIGHT PEN

[75] Inventor: Jean Jacques Mayer, Paris, France

[73] Assignee: Compagnie Internationale Pour L'Informatique - C.I.I., Louveciennes, France

[22] Filed: July 29, 1974

[21] Appl. No.: 492,920

Related U.S. Application Data

[63] Continuation-in-part of Ser. No. 428,360, is a continuation of Ser. No. 89,799, Nov. 16, 1970, abandoned.

[30] Foreign Application Priority Data
Nov. 21, 1969 France .............................. 69.40101

[52] U.S. Cl. ............ 340/172.5; 178/6.8; 340/324 A
[51] Int. Cl.² ............................................. G06F 3/14
[58] Field of Search ...... 340/172.5, 324 A, 324 AD; 178/6.8

[56] References Cited
UNITED STATES PATENTS

| | | | |
|---|---|---|---|
| 3,337,860 | 8/1967 | O'Hara, Jr. | 340/324 A |
| 3,346,853 | 10/1967 | Koster et al. | 340/172.5 |
| 3,380,028 | 4/1968 | Gustafson et al. | 340/172.5 |
| 3,394,366 | 7/1968 | Dye | 340/324 A |
| 3,399,401 | 8/1968 | Ellis et al. | 340/324 A |
| 3,499,979 | 3/1970 | Fiorletta et al. | 178/6.8 |
| 3,512,037 | 5/1970 | Eckert et al. | 340/324 A X |
| 3,543,240 | 11/1970 | Miller et al. | 340/172.5 |
| 3,594,608 | 7/1971 | Mutton | 340/324 A X |
| 3,696,391 | 10/1972 | Peronneau | 340/324 A |

*Primary Examiner*—Malcolm A. Morrison
*Assistant Examiner*—Jerry Smith
*Attorney, Agent, or Firm*—Karl F. Ross; Herbert Dubno

[57] ABSTRACT

Alphanumerical characters and other figures traced on an oscilloscope screen consist of elemental image components defined by code words which are called forth from a computer memory to actuate a function generator whose analog output is inscribed in a mosaic of a storage tube for orthogonal readout in the form of video pulses controlling the oscilloscope beam. A light pen placed against an illuminated spot of the oscilloscope screen picks up a light pulse which causes the inscription, on the same mosaic, of the code word giving rise to the image component whose trace is touched by the light pen. Different voltage levels of the code bits and of video pulses registered in superposed relationship on the storage mosaic enable their separation in a decoder upstream of the oscilloscope; the code word retrieved from the decoder is used to extinguish, intensify or otherwise mark the selected component within the displayed image.

10 Claims, 5 Drawing Figures

IMAGE-DISPLAY SYSTEM INTERACTING WITH LIGHT PEN

CROSS-REFERENCE TO RELATED APPLICATIONS

This application is a continuation-in-part of my co-pending application Ser. No. 428,360, filed Dec. 26, 1973 as a continuation of my earlier application Ser. No. 89,799, filed Nov. 16, 1970 and now both abandoned.

FIELD OF THE INVENTION

My present invention relates to an image-display system wherein alphanumerical characters and other figures are traced on an oscilloscope screen, each of these figures consisting of a plurality of elemental components which are defined by respective code words stored in a computer memory from which they can be selectively called forth to actuate a function generator forming part of an analog processor.

BACKGROUND OF THE INVENTION

In U.S. Pat. No. 3,696,391, issued in the name of Georges Peronneau, there has been disclosed a system of this type including a marker which can be pointed at a selected part of a display of an oscilloscope screen which an operator wishes to alter or replace. The marker may be a light pen designed to pick up a luminous spot on the screen and to signal its co-ordinates to the computer which determines therefrom the identity of the component to be modified, allowing the operator to change the parameters or to choose a different component with the aid of a keyboard.

The aforedescribed technique is particularly applicable to a system in which the individual image components are traced by random scanning, under the control of analog voltages emitted by the aforementioned function generator, since in that case the code words relating to the several image components are sequentially read out from memory into a register of a control unit in which they are stored for the duration of the tracing operation so as to be instantly available whenever the marker touches a point on the oscilloscope screen illuminated exclusively the the corresponding trace. However, random-scanning systems have the drawback that the time required for tracing a particular character varies with the information content thereof, i.e. with the number and complexity of the constituent image elements. Thus, the renewal rate of such a character depends on this information content and varies therefore from one character to another, with a consequent fluctuation of luminous intensity. Moreover, it is difficult if not impossible in such a system to superimpose images from different sources on one and the same screen by electronic means.

With an orthogonal or raster-type scan as used in television reception, on the other hand, figures of any configuration can be reproduced at a uniform recurrence rate of, say, 50 frames per second. During each frame period, a pulse pattern encompassing all the image components of the display is present in a refreshing memory such as a storage tube. Thus, a code word identifying an individual component of that display is not necessarily present in a register of the processor at the instant when a light pen is pointed at a corresponding part of the oscilloscope screen.

OBJECTS OF THE INVENTION

The general object of my invention is to provide an improved system of the type referred to, including sweep means for the periodic deflection of a beam across a screen, in which the operator can converse with an associated computer through the intermediary of a light pen in essentially the manner that has been disclosed in the above-identified Peronneau patent with reference to a random-scanning system.

A more particular object is to provide means in such a system for separating two kinds of signals, namely video pulses and accompanying code words, in the output of a single storage tube in which they are inscribed in superposed relationship.

SUMMARY OF THE INVENTION

My improved system for displaying composite images comprises, essentially, an oscilloscope provided with an intensity-control input for its electron beam and with sweep means for the periodic deflection of that beam across a screen to produce a luminous trace thereon in response to analog signals produced by a function generator controlled, in the manner described in the aforementioned Peronneau patent, by code words read out from memory. The analog signals from the function generator are temporarily loaded into a storage device, such as a conventional scan-converter tube, in which they give rise to a pattern of video pulses of a first voltage level. A light pen, juxtaposable with a selected location on the screen for picking up light pulses from a displayed trace, controls a gating circuit for inscribing a selected code word — associated with an image component by the light pen — in the same storage device in the form of a pattern of code pulses of a second voltage level superimposed upon the pattern of video pulses. The pulses of the superposed patterns are sequentially extracted from this storage device, under the control of scanning means synchronized with the sweep means of the oscilloscope, in the form of a multilevel pulse train fed to a decoder which derives therefrom a video-pulse train delivered to the intensity-control input of the oscilloscope tube and a code-pulse train corresponding to the selected code word; a display-modifying circut, connected to the decoder, alters the appearance on the screen of the image component corresponding to this selected code word, as by intermittently suppressing its trace to produce a blinking outline within the otherwise unaltered overall display. Alternatively, the code-pulse train isolated by the decoder could be used to intensify the corresponding trace.

According to a more specific feature of my invention, the decoder separating the video pulses of the incoming composite pulse train from the accompanying code pulses comprises a plurality of comparators connected in parallel to the output of the storage device, each comparator being further connected to one of several sources of reference voltages (such as taps on a voltage divider) whose magnitudes are selected in conformity with the amplitudes of the constituent pulse trains. In a preferred embodiment, these two pulse trains have an amplitude ratio of 2:1.

BRIEF DESCRIPTION OF THE DRAWING

The above and other features of my invention will now be described in detail with reference to the accompanying drawing in which.

SPECIFIC DESCRIPTION

Figure 1:
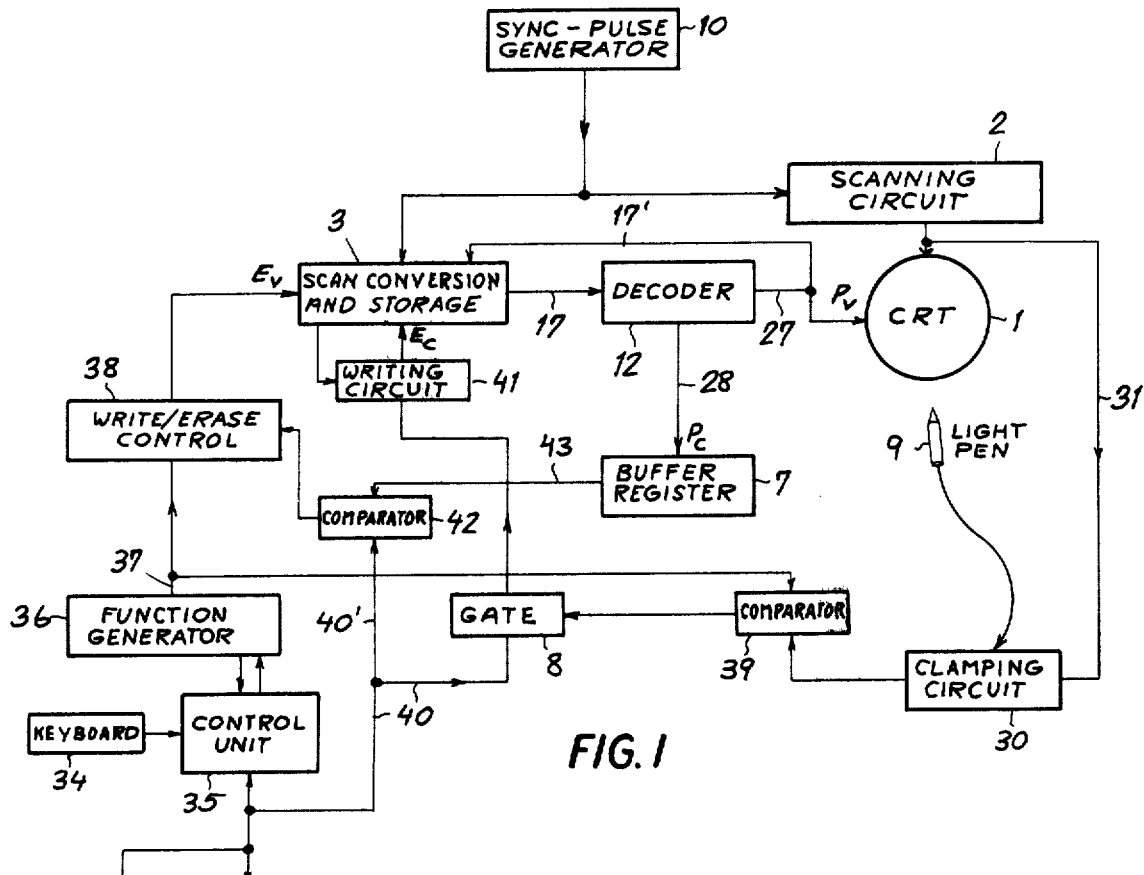
FIG. 1 is a block diagram of an image-display system embodying my invention.

In FIG. 1 I have shown an oscilloscope 1 comprising a conventional cathode-ray tube, the beam of that tube being orthogonally deflected by a scanning circuit 2 including the usual line- and frame-sweep generators. A light pen 9, e.g. of the type disclosed in Floret et al. U.S. Pat. No. 3,559,182, can be placed at a seleted location against the screen to pick up luminous pulses. This light pen works into a clamping circuit 30 also receiving, via a line 31, the instantaneous output of scanning circuit 2; energization of light pen 9 by a luminous spot causes the circuit 30 to preserve a pair of voltages, representing the corresponding $x$ and $y$ coordinates, until the pen is removed from the screen.

Figure 4:
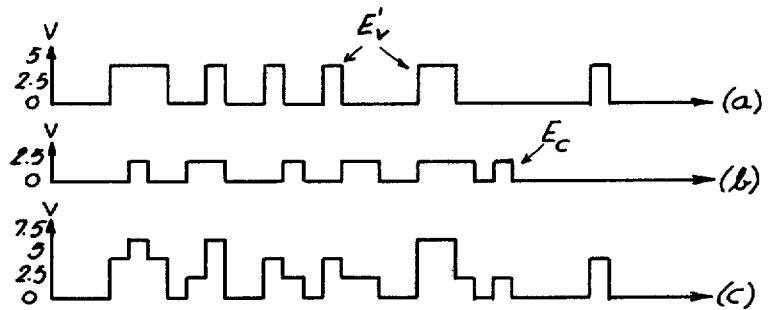
FIG. 4 is a set of graphs serving to explain the operation of the mixer of FIG. 3.

A computer 32 coacts with a service memory 33, as described in the aforementioned Peronneau U.S. Pat. No. 3,696,391, to read out respective code words identifying the components of an mage to be displayed on oscilloscope 1, in response to commands from a keyboard 34 transmitted to a control unit 35, for the actuation of a function generator 36 producing a variety of analog voltages $E_v$ on an output line 37. These analog voltages are delivered to a write/erase controller 38 and, in parallel therewith, to a comparator 39 also receiving the output of clamping circuit 30. Comparator 39 controls a gate 8 in series with a multiple 40 over which code words $E_c$ from memory 33 are transmitted to a writing circuit 41 working into an input of a scan-conversion and storage tube 3, another input of this tube receiving the analog voltages $E_v$ from controller 38. A branch 40' of multiple 40 extends to a comparator 42 whose output determines the operation of unit 38 as more fully described hereinafter. The reading of storage tube 3 is synchronizeed with the sweep of oscilloscope 1 by the output of a pulse generator 10 connected to respective inputs of tube 3 and scanning circuit 2. A decoder 12, more fully described below with reference to FIG. 5, receives the output of tube 3 over a lead 17 and derives therefrom a train of video pulses $P_v$, FIG. 4($a$), and a train of code pulses $P_c$, FIG. 4($b$), respectively, delivered to the control grid of oscilloscope 1 via a lead 27 and to a buffer register 7 via a lead 28. Buffer register 7 works into another input of comparator 42 via a multiple 43. Video pulses $P_v$ are also fed back over a branch 17' of lead 27 to a refresher input of tube 3.

When an operator wishes to display certain characters on the screen of oscilloscope 1, he actuates his keyboard to call forth the corresponding code words from service memory 33. These code words are transmitted to function generator 36 in their proper time positions within a program cycle, by way of control unit 35 as described in the aforementioned Peronneau patent, whereupon the corresponding analog voltages $E_v$ are inscribed through the intermediary of controller 38 in the scan-conversion and storage tube 3 whose storage elements form an orthogonal mosaic to be periodically sampled by a scanning unit (not illustrated) in step with circuit 2. With gate 8 normally closed, writing circuit 41 is inoperative so that decoder 12 receives only the video pulses $P_v$ on lead 17 and retransmits them to the intensity-control grid of tube 1 via lead 27. These pulses also serve to refresh the video pattern in the mosaic of storage tube 3 to which they are returned via branch lead 17'; their reinscription can be blocked by the operator via a nonillustrated connection from keyboard 34.

Let us now assume that the operator wishes to check on a particular image component of a character or other figure displayed on oscilloscope 1. Light pen 9, on being touched to a corresponding part of the screen, activates the clamping circuit 30 upon its first energization as the beam sweeps past its photosensitive top. This energization causes the instant sweep voltages of scanner 2, appearing on line 31, to be preserved within the circuit 30 and to be read out from that circuit to comparator 39. As soon as a corresponding voltage pair appears on the output line 37 of function generator 36, comparator 39 responds and unblocks the gate 8 to let the code word then present on multiple 40 pass to the writing circuit 41. This writing circuit, receiving the bits of that code word in parallel from multiple 40, delivers them in series as a code word $E_c$ to storage tube 3. Advantageously, writing circuit 41 is so synchronized with the reading sweep of tube 3 as to enter that code word in the same scanning line of the storage mosaic which contains the video pulse picked up by the light pen, or in the next-following line of that video pulse lies too close to the end of its scanning line to enable entry of the entire code word in the remaining line portion. A timer within circuit 41 allows only one inscription of a code word per frame.

It may be mentioned, by way of example, that a code word may consist of two 10-bit groups, the second group being an inverted replica of the first and serving the purpose of verification. With a bit spread over five storage elements of the tube mosaic, such a code word will occupy one-fifth of a line composed of 500 storage elements.

If the pen 9 is applied to a point of the screen representing the intersection of two or more image components such as lines or arcs, the code word first extracted from memory 33 will have precedence over the others and, as long as it occupies the writing circuit 41, will prevent the entry of another code word into that circuit. The timer of circuit 41 may establish a minimum period during which such lockout is effective upon the energization of one or more leads of incoming multiple 40.

The code word fed into the storage tube 3, represented by voltage $E_c$, is superimposed in the storage mosaic upon the video pulses registered therein. Thus, a composite pulse train is read out on lead 27 to the decoder 12 which separates the video pulses $P_v$, on lead 27, from the code pulses $P_c$, on lead 28. The latter pulses, therefore, are serially transmitted to buffer register 7 whence, at a certain point in a program cycle determined by a nonillustrated master clock, they are delivered in parallel over multiple 43 to comparator 42 receiving over multiple 40' the code words successively extracted from memory 33. In the next program cycle, upon the recurrence of the same code word on multiple 40, comparator 42 switches the controller 38 from its normal writing position to its erase position in which that particular code word causes the cancellation of the corresponding video pulses from the stored pattern in tube 3. This action blanks out, on the screen of oscilloscope 1, the trace marked by the light pen 9 whereupon the clamping circuit 30 is released and gate 8 stays closed for at least the remainder of the cycle.

In the following program cycle, the same code word is read out from memory 33 in the normal manner (unless the operator, or the programmer within computer 32, has given different instructions to control unit 35 in the interim) and restores the previously blanked-out trace to the screen. If the light pen is still held in the same position, the aforedescribed sequence is repeated as the pen is re-energized by a luminous spot forming part of the restored trace. Thus, the operator will observe a blinking trace at the location marked by the pen. The operator could now actuate a special key on keyboard 34 to prevent reinscription of the previously suppressed analog signal from function generator 38 until modified instructions have been given to control unit 35 via keyboard 34. During this changeover period the pulse pattern of the storage mosaic is maintained only by the feedback via lead 17'.

Figure 2:
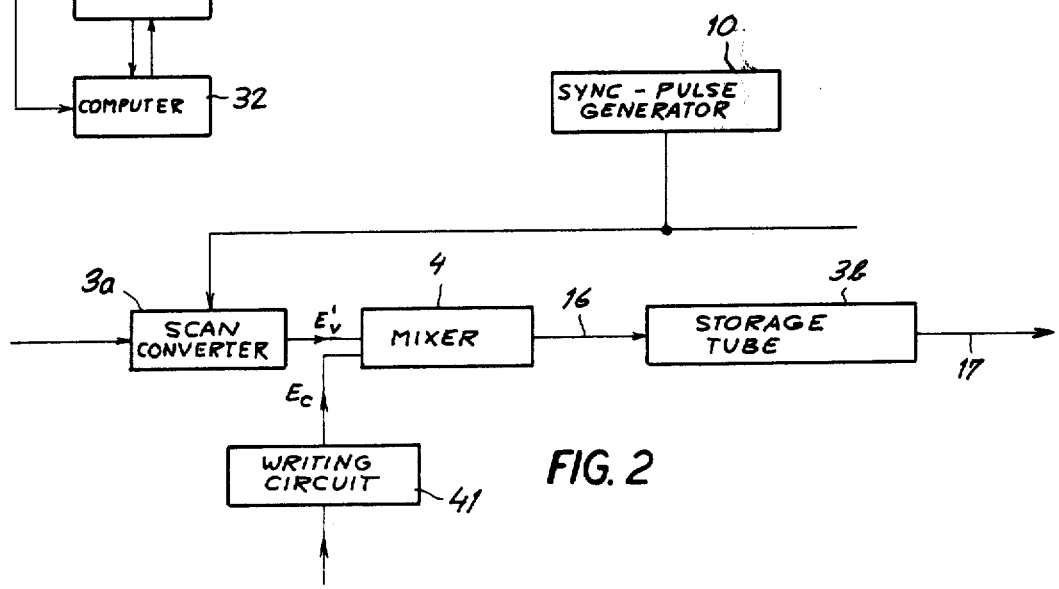
FIG. 2 is a fragmentary block diagram illustrating a partial modification of the system of FIG. 1.

As shown in FIG. 2, the system of FIG. 1 may be modified by replacing the combined scan-conversion and storage tube 3 of FIG. 1 (e.g. a tube of the type manufactured in the United States by Hughes Aircraft Company) with a scan converter 3a and a storage tube 3b separated by a mixer 4. Scan converter 3a delivers video pulses $E'_v$ to mixer 4 which also receives the code pulses $E_c$ from writing circuit 41 whenever the gate 8 (FIG. 1) is opened, the pulse train $E'_v$ being read out with an orthogonal scan from converter 3a. Thus, storage tube 3b receives from mixer 4 a composite pulse train for storage in its mosaic and subsequent transmission to decoder 12 in the same scanning rhythm.

Figure 3:
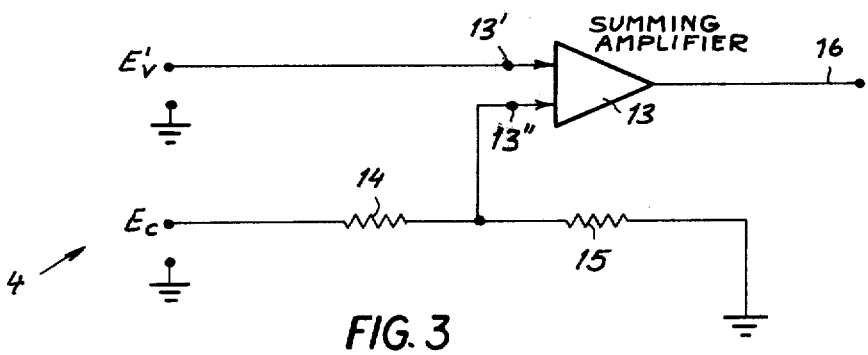
FIG. 3 shows details of a mixer circuit included in the system of FIG. 2.

FIG. 3 shows details of mixer 4 which comprises a summing amplifier 13 having an input 13' for the video pulses $E'_v$ and another input 13'' for the code pulses $E_c$, the latter input being tied to a tap on a voltage divider 14, 15 connected across the output of writing circuit 41 (FIG. 2). Voltage divider 14, 15 is so dimensioned that pulses $E_c$ have half the amplitude of pulses $E'_v$ as illustrated in graphs (a) and (b) of FIG. 4 where their respective pulse levels have been indicated at 5V and 2.5V. The resulting composite unipolar pulse train, shown in graph (c) of FIG. 4, thus has four distinct voltage levels of 0, 2.5V, 5V and 7.5V.

Storage tube 3b preserves these voltage levels so that the pulse train read out via lead 17 to decoder 12 is substantially identical with the one fed into that tube over an output lead 16 of summing amplifier 13. Decoder 12 discriminates among the four voltage levels of that pulse train to separate the video pulses $P_v$ from the code pulses $P_c$.

Figure 5:
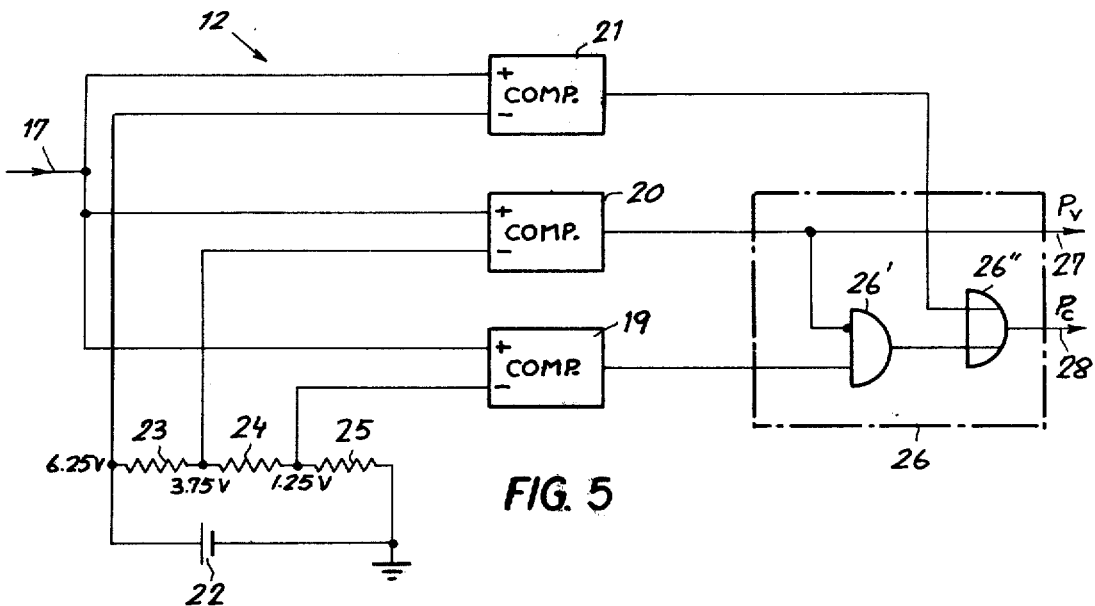
FIG. 5 shows details of a decoder illustrated in block form in FIG. 1.

As particularly illustrated in FIG. 5, the decoder 12 comprises a set of three comparators 19, 20 and 21 each having one input (+) connected to lead 17 and another input (−) tied to a respective voltage source represented by a battery 22 and a voltage divider 23, 24, 25 connected thereacross. In order to afford the necessary tolerance for minor voltage fluctuations, the reference inputs of comparators 19–21 are biased at approximately 1.25V, 3.75V and 6.25V, respectively. These comparators work into a logic network 26 comprising an AND gate 26', with an inverting input connected to the output of comparator 20 and a noninverting input connected to the output of comparator 19, and an OR gate 26'' having inputs connected to the outputs of AND gate 26' and comparator 21, respectively. The output of comparator 20 directly energizes the lead 27 with video pulses $P_v$ whereas the output of OR gate 26'' generates the code pulses $P_c$ on the lead 28.

Since the compound tube 3 of FIG. 1 essentially operates in the same way as the assembly 3a, 4, 3b of FIG. 2, the decoder 12 shown in FIG. 5 can be used in either system upstream of the oscilloscope 1. The function generator 36 and its associated circuits could be duplicated to permit the simultaneous or alternate loading of tube 3 or scan converter 3a with input signals from a plurality of sources.

I claim:
1. A system for displaying composite images, comprising:
    an oscilloscope provided with an intensity-control input for an electron beam thereof and with sweep means for the periodic deflection of said beam across a screen to produce thereon a luminous trace;
    a light pen juxtaposable with a selected location on said screen for picking up light pulses from a displayed trace;
    a computer provided with memory means for the storage of a multiplicity of code words identifying different components of an image to be traced on said screen;
    function-generating means coupled to said memory means and responsive to a code word read out therefrom for producing an analog signal representing a corresponding image component;
    storage means connected to said function-generating means for temporary loading by an analog signal generated in response to the readout of a code word from said memory means, said analog signal giving rise to a pattern of unipolar video pulses of a first amplitude in said storage means;
    gating means controlled by said light pen for inscribing a selected code word, associatd with an image component touched by the light pen, in said storage means in the form of a pattern of code pulses having the same polarity as said video pulses, of a second amplitude different from said first amplitude, superimposed upon said pattern of video pulses;
    scanning means synchronized with said sweep means for sequentially extracting the pulses of the superposed patterns from said storage means in the form of a unipolar pulse train with three distinct voltage levels besides zero;
    decoder means connected to said storage means for receiving said unipolar pulse train therefrom and deriving from said three voltage levels thereof a video-pulse train delivered to said intensity-control input and a code-pulse train corresponding to the selected code word; and
    display-modification means connected to said decoder means for altering the appearance on said screen of the image component corresponding to said selected code word.
2. A system as defined in claim 1 wherein said storage means comprises a scan-converter tube.
3. A system as defined in claim 1 wherein said display-modification means comprises a blanking circuit for temporarily suppressing said corresponding image component.

4. A system as defined in claim 1, further comprising scan-conversion means connected to said function-generating means for deriving a binary pulse sequence from said analog signal, and mixer means inserted between said scan-conversion means and said storage means, said mixer means being connected to said gating means for sequentially receiving the bits of the selected code word therefrom and combining same with said binary pulse sequence into a composite pulse train delivered to said storage means.

5. A system as defined in claim 4 wherein said mixer means comprises a summing amplifier with a first input circuit connected to said scan-conversion means and a second input circuit connected to said gating means, one of said input circuits including impedance means for making the amplitude of said binary pulse sequence different from the amplitude of the bits of said selected code word.

6. A system as defined in claim 5 wherein said impedance means is dimensioned to make one of said amplitudes a multiple of the other amplitude.

7. A system as defined in claim 6 wherein the amplitude ratio is 2:1.

8. A system as defined in claim 1 wherein said decoder means comprises three comparators connected in parallel to said storage means, said comparators being further connected to respective sources of reference voltages of the same polarity as said unipolar pulse train including a first reference voltage less than the lowest of said three voltage levels, a second reference voltage between the lowest and the second-lowest of said three voltage levels, and a third reference voltage between the second-lowest and the highest of said three voltage levels.

9. A system as defined in claim 1 wherein said scanning means and said sweeping means generate a scanning frame consisting of a multiplicity of parallel lines, the pattern of code pulses derived from a code word extending over a fraction of a line.

10. A system as defined in claim 9 wherein said gating means is operable to inscribe said pattern of code pulses in a line of said storage means immediately adjacent a video pulse giving rise to a light pulse picked up by said light pen.

* * * * *